United States Patent
Park

(10) Patent No.: US 10,326,929 B2
(45) Date of Patent: Jun. 18, 2019

(54) CAMERA DRIVING DEVICE AND METHOD FOR SEE-THROUGH DISPLAYING

(71) Applicant: IPLAB INC., Seoul (KR)

(72) Inventor: Jun Hyun Park, Gimpo-si (KR)

( * ) Notice: Subject to any disclaimer, the term of this patent is extended or adjusted under 35 U.S.C. 154(b) by 53 days.

(21) Appl. No.: 15/666,202

(22) Filed: Aug. 1, 2017

(65) Prior Publication Data

US 2018/0041695 A1 Feb. 8, 2018

(30) Foreign Application Priority Data

Aug. 2, 2016 (KR) .................. 10-2016-0098420

(51) Int. Cl.
 *H04N 7/18* (2006.01)
 *H04N 5/232* (2006.01)
 *A63F 13/833* (2014.01)

(52) U.S. Cl.
 CPC ....... *H04N 5/23219* (2013.01); *A63F 13/833* (2014.09); *H04N 5/23212* (2013.01); *H04N 5/23296* (2013.01)

(58) Field of Classification Search
 CPC .............................................. H04N 5/23219
 USPC ....................................................... 348/158
 See application file for complete search history.

(56) References Cited

U.S. PATENT DOCUMENTS

| 2011/0216209 | A1* | 9/2011 | Fredlund | G06F 21/32 |
| | | | | 348/211.99 |
| 2012/0293643 | A1* | 11/2012 | Hanna | H04N 5/23212 |
| | | | | 348/78 |
| 2014/0085451 | A1* | 3/2014 | Kamimura | H04N 5/23219 |
| | | | | 348/78 |
| 2016/0309081 | A1* | 10/2016 | Frahm | G06F 3/013 |

FOREIGN PATENT DOCUMENTS

| KR | 10-2006-0104606 | 10/2006 |
| KR | 10-2007-0066668 | 6/2007 |
| KR | 10-2013-0127472 | 11/2013 |
| KR | 10-2013-0139280 | 12/2013 |
| KR | 10-2014-0122126 | 10/2014 |

\* cited by examiner

*Primary Examiner* — Leron Beck
(74) *Attorney, Agent, or Firm* — Lee & Associates, LLC; Jake K. Lee

(57) ABSTRACT

A camera driving device for see-through displaying in an augmented reality and a method thereof are disclosed. A rear camera driving device of a smart terminal includes a sensing module sensing the real-time natural sight conditions of the user including a sight line, a visual angle, and a view of the user of the smart terminal, and a distance and an angle between a pupil and the smart terminal; a control module controlling shooting conditions including an optical angle, a focus, a focal length and a magnification of a rear camera of the smart terminal based on the real time natural sight conditions of the user transmitted from the sensing module; and a shooting module driven according to the shooting conditions transmitted from the control module.

9 Claims, 7 Drawing Sheets

- Prior Art -

CAMERA DRIVING DEVICE AND METHOD FOR SEE-THROUGH DISPLAYING

CROSS-REFERENCE TO RELATED APPLICATIONS

Pursuant to 35 U.S.C. § 119, this application claims the benefit of priority to Korean Patent Application No. 10-2016-0098420, filed Aug. 2, 2016 in the Korean Intellectual Property Office, the entire contents of which are hereby incorporated by reference.

TECHNICAL FIELD

This disclosure relates to a camera driving device and method, and more particularly, to a camera driving device and a method for see-through display.

BACKGROUND

Unless otherwise indicated herein, contents set forth in this section are neither a prior art to the claims of the present application, nor construed as a prior art despite the inclusion in this section. Augmented Reality (AR) is a technology that overlaps a 3D virtual image on a real image or background, and displays it as a single picture. As an example of the use of the augmented reality technology, an augmented reality fighting game is a form in which 'I in reality' confront a virtual enemy in 'a real space.' The augmented reality is characterized by being more realistic than a virtual reality because it overlaps a virtual image in the reality space. In addition, the virtual reality is generally used only in special environments such as a film and video field, but the augmented reality is currently popular enough to be widely used by the general public. Specifically, a map search, a location search, and the like through the internet are included in the augmented reality in a broad sense. However, since computers are difficult to use while moving, attention has been paid to augmented reality technologies targeting portable smart terminals such as smart phones and tablet PCs.

However, the conventional augmented reality technology has problems that the controller operating a task, such as the user's gesture or hand gesture, interferes with a view. There is mismatch between a screen the user views, i.e., a view by the user's natural sight, and a task screen which is displayed after being shot by a camera, thereby making it difficult to provide intuitive feedback and requiring a lot of time to training in performing a task.

In addition, even when shooting with a camera equipped in the smart terminal, a screen and an actual visible background are distorted and displayed on a front display of the smart terminal due to mismatches in a distance and an angle between a rear camera lens of the smart terminal and a pupil. Thus, it is difficult to accurately reflect a desired screen and picture when outputting a screen or taking photos or videos in the augmented reality. Specifically, referring to FIG. 1A which illustrates a conventional augmented reality display, upon comparison of an image 20 of a subject as viewed by the user's natural sight 10 and an image 50 shot by the rear camera of the smart terminal and displayed on a front of the smart terminal, a focus, a size, and a magnification, etc. of the subject included in the image displayed on the front of the smart terminal are different from those of the natural sight actually seen by the user and are distorted by shooting conditions of the rear camera 40. Since the image 50 different from an image viewed by an actual view is displayed on the front of the smart terminal, when using augmented reality related applications (for example, Pokemon GO 60, etc.), there is a mismatch in an angle and distance between a scene viewed with a naked eye and a screen of a device, thereby often reducing the liveliness. In addition, in a general camera shooting, when the user intends to shoot with his/her natural sight conditions, it is cumbersome because the user has to adjust the shooting conditions himself/herself to be the same as the natural sight conditions. Further, in practice, since it is very difficult to control the shooting conditions to be the same as the natural sight conditions, it is not easy to obtain the same image as the natural sight in case of shooting pictures or videos.

SUMMARY OF THE DISCLOSURE

The present invention provides a camera driving device and a method thereof which recognize a user's natural sight on a front of a portable smart terminal, and control shooting conditions of a rear camera to drive a camera mounted on a rear of a smart terminal as the same conditions as viewed by his/her eye of the user, thereby minimizing a distortion between an image recognized by the user's natural sight and an image shot by the rear camera and displayed on a front of the smart terminal.

As one embodiment, a rear camera driving device of a smart terminal includes a sensing module sensing real-time natural sight conditions including a sight line, a visual angle, a view of a smart terminal user, and a distance and an angle between a pupil and the smart terminal; a control module controlling shooting conditions including an optical angle, a focus, a focal length, and a magnification of a rear camera of the smart terminal based on the user's real time natural sight conditions transmitted from the sensing module; and a shooting module driven according to the shooting conditions transmitted from the control module.

As another embodiment, a method for a see-through display of an image shot by a rear camera of a smart terminal includes (A) sensing, in a sensing module, user's real-time natural sight conditions including a sight line, a visual angle, and a view of the user of the smart terminal, and a distance and an angle between a pupil and the smart terminal, and the smart terminal; (B) controlling, in a control module, shooting conditions including an shooting angle, a focus, a focal length and a magnification of a rear camera of the smart terminal based on the user's natural sight conditions transmitted from the sensing module; (C) shooting, in a camera, by being driven according to the shooting conditions transmitted from the control module.

The camera driving device and method according to the embodiments improve user experience in the augmented reality and improves user convenience by automatically operating a camera as the same conditions as a user's natural sight upon shooting. The camera driving device and method according to the embodiments may have other effects other than those described above.

DETAILED DESCRIPTION OF THE DISCLOSURE

Figure 1A:
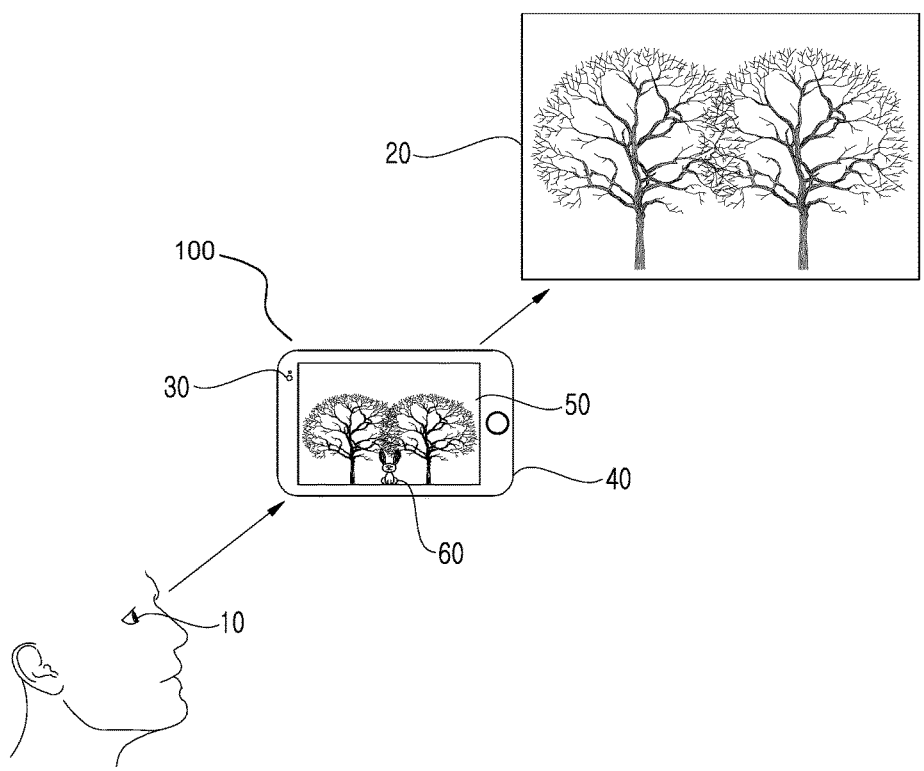
FIG. 1A is a view illustrating a conventional augmented reality display.

The advantages and features of the present invention, and methods to accomplish the same, will become apparent with reference to embodiments described in detail below with reference to the accompanying drawings. However, the present invention is not limited to the embodiments described below but may be implemented in a variety of different forms. These embodiments are provided so that the disclosure of the present invention is complete and that those skilled in the art will fully understand the scope of the present invention, and the present invention is only defined by the scope of the claims. Like reference numerals refer to like elements throughout the specification.

In describing the embodiments of the present invention, detailed description of known functions and configurations will be omitted when it may make the subject matter of the present invention unnecessarily unclear. The following terms are defined in consideration of the functions in the embodiments of the present invention, which may vary depending on the user, the intention of the operator, the custom, and the like. Therefore, the definition should be based on contents throughout this specification.

Figure 1B:
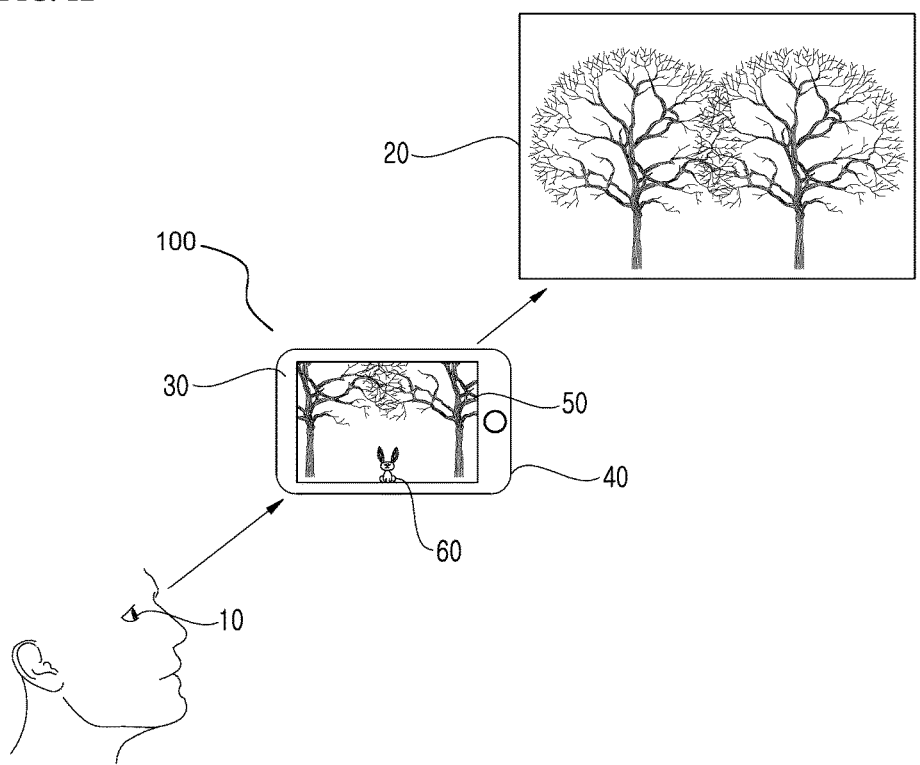
FIG. 1B is a view illustrating an embodiment of using a camera driving device.

FIG. 1B is a view illustrating an embodiment of using a camera driving device.

Referring to FIG. 1B, the present disclosure provides to recognize a user's natural sight at a front A of a portable smart terminal 100, and to control shooting conditions of a rear camera 40 so that a shoot may be performed by the camera 40 equipped on a rear B of the smart terminal as the same conditions as viewed by his/her eye of the user. In this way, a distortion between an image 20 recognized by the user's natural sight and an image 50 recognized by the rear camera 40 and then displayed on the front A of a smart phone 100 is minimized and the same image as viewed by the user's natural sight is displayed on the front of the smart terminal, thereby improving a user experience of augmented reality users. As shown in FIG. 1, when an augmented reality game (for example, Pokemon GO 60) is played, applying the present disclosure, the distortion between a screen displayed on the front of the smart terminal possessed by a user and a natural sight may not be recognized, thereby further improving the reality of a game using an augmented reality. In addition, even when shooting a general photography or movie, it may further provide with a shooting option which automatically recognizes the user's natural sight conditions, adjusts shooting conditions of a camera to be the same as the natural sight conditions, and then shoots with a natural sight.

In an embodiment, the smart terminal may be any one of a tablet PC, a laptop, a personal computer (PC), a smart phone, a personal digital assistant (PDA), a camera, a game device, a mobile communication terminal, or the like. The smart terminal means an electronic device having a memory, a microprocessor for executing, operating, and controlling a program, or the like.

In order to facilitate understanding of the present disclosure, an example of driving a camera provided in the smart terminal will be described in the description of embodiments, but the scope of the present disclosure is not limited thereto. The present disclosure may be applied to driving a general camera, and various embodiments for recognizing the user's natural sight and controlling the shooting conditions to be the same as the natural sight conditions, such as an embodiment for recognizing the user's sight line and then reflecting it to shoot, as well as driving the camera provided in the smart terminal.

Figure 2:
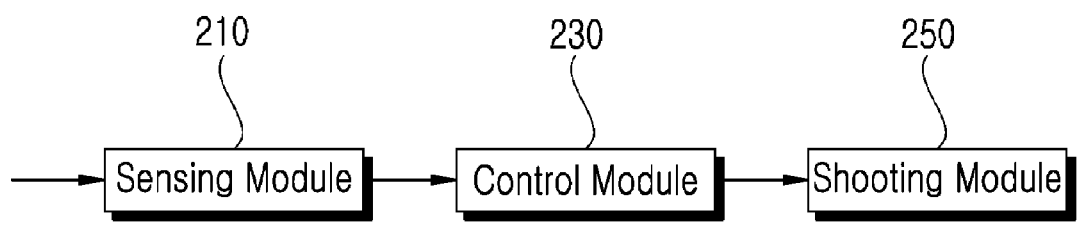
FIG. 2 is a block diagram illustrating a schematic configuration of a camera driving device according to an embodiment.

FIG. 2 is a block diagram illustrating a schematic configuration of a camera driving device according to an embodiment.

Referring to FIG. 2, the camera driving device may include a sensing module 210, a control module 230, and a shooting module 250. In an embodiment, the sensing module 210 may be provided on the front A of the smart terminal 100, and the shooting module 250 may be provided as a camera on the rear B of the smart terminal. The term 'module,' as used herein, should be interpreted to include software, hardware, or a combination thereof, depending on the context in which the term is used. For example, the software may be machine language, firmware, embedded code, and application software. As another example, the hardware may be a circuit, a processor, a computer, an integrated circuit, an integrated circuit core, a sensor, a micro-electromechanical system (MEMS), a passive device, or a combination thereof.

The sensing module 210 senses natural sight conditions of the user of the smart terminal in real time. The natural sight conditions are the conditions to sense for adjusting the camera to be the same as a sight line, a visual angle, and view conditions as viewed by the user, and displaying the same image as recognized by the user's eye on the front A of the smart terminal 100. For example, the natural sight conditions sensed by the sensing module 210 may include all condition data that may change an image that the user recognizes with his or her eye, such as the user's view, sight line, and visual angle, and a distance between a pupil and the smart terminal, an angle between the user's sight line and the smart terminal, or a degree of rotation of a user's head. Further, the sensing module 210 may also sense brightness information of a surrounding environment shot by the camera of the smart terminal 100 to adjust the brightness of a screen displayed on the front of the smart terminal to a level similar to the brightness of the surrounding environment.

The control module 230 controls the shooting conditions of the camera provided on the rear B of the smart terminal based on the user's natural sight conditions transmitted from the sensing module 210. Specifically, it controls the shooting conditions including a shooting angle, a focus, and a focal length of the rear camera of the smart terminal based on the user's sight line, view, visual angle information, and the distance and angle information between a pupil and the smart terminal included in the natural sight conditions. For example, the control module 230 adjusts a degree of zoom in of an object shot by the camera using a distance between the recognized user and the smart terminal, and adjusts a focus for each object based on focus information. In addition, according to an embodiment, the control module 230 may adjust an image displayed and also adjust a size and magnification of the image displayed by analyzing the user's movement and movement change, such as the head rotation.

The shooting module 250 may be a camera provided on the rear B of the smart terminal 100 according to an embodiment, and may be a plurality of cameras including an optical angle camera. The shooting module 250 is driven according to the shooting conditions transmitted from the control module 230. As disclosed, since the rear camera of the smart terminal is driven in accordance with the shooting conditions, a distortion between an image recognized by the user's natural sight and an image shot by the camera and displayed on the front of the smart terminal is minimized, thereby displaying an image that the user actually sees on the front of the smart terminal. When such an embodiment is used for an augmented reality technology, the reality of the augmented reality is further improved because a three-dimensional virtual image is overlapped on an image shot in the user's natural sight conditions. In addition, when the embodiment is applied to a general photography and movie shooting, it is advantageous in that the user does not have to manipulate the shooting conditions of the camera so as to be the same as his/her natural sight conditions.

Figure 3:
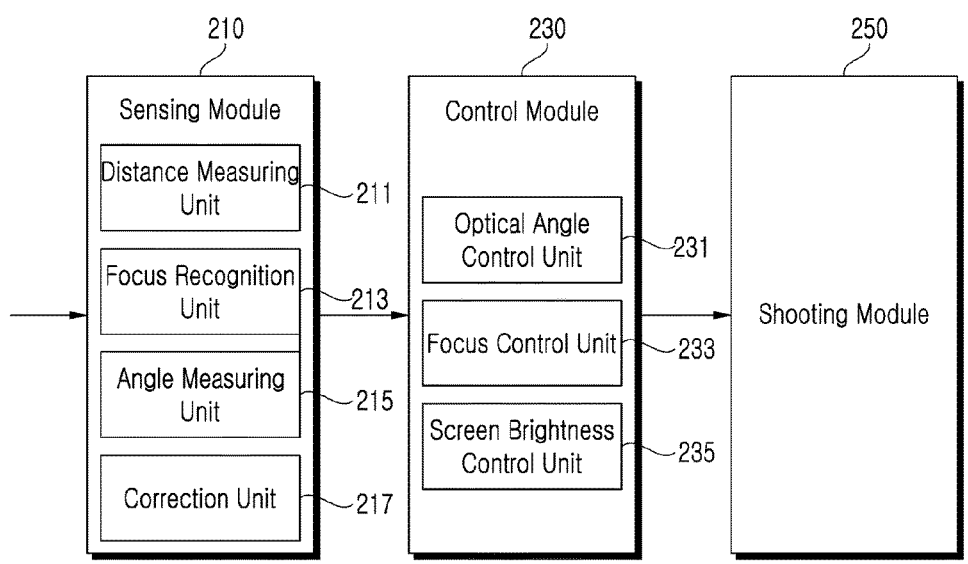
FIG. 3 is a block diagram illustrating more specific configurations of a camera driving device according to an embodiment.

FIG. 3 is a block diagram illustrating more specific configurations of a camera driving device according to an embodiment.

Referring to FIG. 3, the sensing module 210 may include a distance measuring unit 211, a focus recognition unit 213, an angle measuring unit 215, and a correction unit 217, and the control module 230 may include an optical angle control unit 231, a focus control unit 233, and a screen brightness control unit 235.

The distance measuring unit 211 of the sensing module 210 measures a distance between a front A camera of the smart terminal 100 and the user. For example, the distance measuring unit 211 measures a distance between a front camera of a smart terminal and a user using various distance measurement techniques such as triangulation or radio wave transmission/reception time calculation by radio wave radar.

The focus recognition unit 213 recognizes the user' eye using the measured distance and the front camera of the smart terminal, and recognizes the user's focus by sensing an iris and a pupil from the recognized eye.

The angle measuring unit 215 measures an angle between the front camera of the smart terminal 100 and the user's sight line. For example, the angle measuring unit 215 may select a corresponding area from an image collected by a fish-eye lens provided in the smart terminal according to an angle between the smart terminal and the sight line, and display the selected area on the front. Further, the angle measuring unit 215 may include a driving unit on a lens of the front camera to track the user's sight line and to measure an angle between the tracked user's sight line and the smart terminal.

The correction unit 217 reflects a pre-stored distance between the front camera 30 and the rear camera 40 of the smart terminal 100 and corrects distance data between the user and the smart terminal 100 transmitted from the distance measuring unit 211 and the user's focus data transmitted from the focus recognition unit 213. For example, a distance and sight line direction with the sensed user's pupil may be corrected by pre-storing a relative position between the front camera and the rear camera of the smart terminal (a fixed value for each smart terminal) and by using a plurality of cameras provided on the front of the smart terminal based on corrected values of distance and angle.

In addition, the correction unit 217 may correct data transmitted from the distance measuring unit 211, the focus recognition unit 213, the angle measuring unit 215 using accumulated sensing data and the user's body data including a pre-stored eye position for each distance, a maximum arm length, an iris and a pupil recognition information of the user of the smart terminal. Also, according to the embodiment, the correction unit 217 may correct the sensed distance and focus data between the user and the smart terminal by analyzing an up, down, left, and right movements of the user's head.

The optical angle control unit 231 of the control module 230 controls a driving optical angle of the camera including a view angle, a shooting direction of the rear camera of the smart terminal based on the sensed natural sight conditions of the user in order to match a size and an angle of a screen shot by the rear camera of the smart terminal with a surrounding background of the smart terminal. For example, the optical angle control unit 231 adjusts an optical angle of the rear camera of the smart terminal according to the user's visual angle to be displayed an image recognized by the user's natural sight on the smart terminal based on a position of the smart terminal, the user's eye position, and a distance and focus data between the smart terminal and the user's eye. In an embodiment, the optical angle control unit 231 may also control an on/off of the optical angle camera when the optical angle camera is included in the shooting module 250.

The focus control unit 233 controls the focus for each object included in an image shot using the sensed focus information of the user. For example, the focus control unit 233 may adjust each focus of an object on which a main focus of the sensed user is focused, and an object on which the main focus is not focused, but included in the user's view and displayed on the front of the smart terminal, respectively.

The screen brightness control unit 235 controls the brightness of the screen displayed based on the sensed surrounding brightness data to be similar to surrounding brightness in a predetermined range. For example, the screen brightness control unit 235 may adjust a color, brightness, and a saturation which are color components of the screen that change according to the surrounding brightness data.

Hereinafter, a camera driving method will be described in turn. Since the action (function) of the camera driving method according to the embodiment is essentially the same as the function on the camera driving device and the system, a description overlapping with those of FIGS. 1 to 3 will be omitted.

Figure 4:
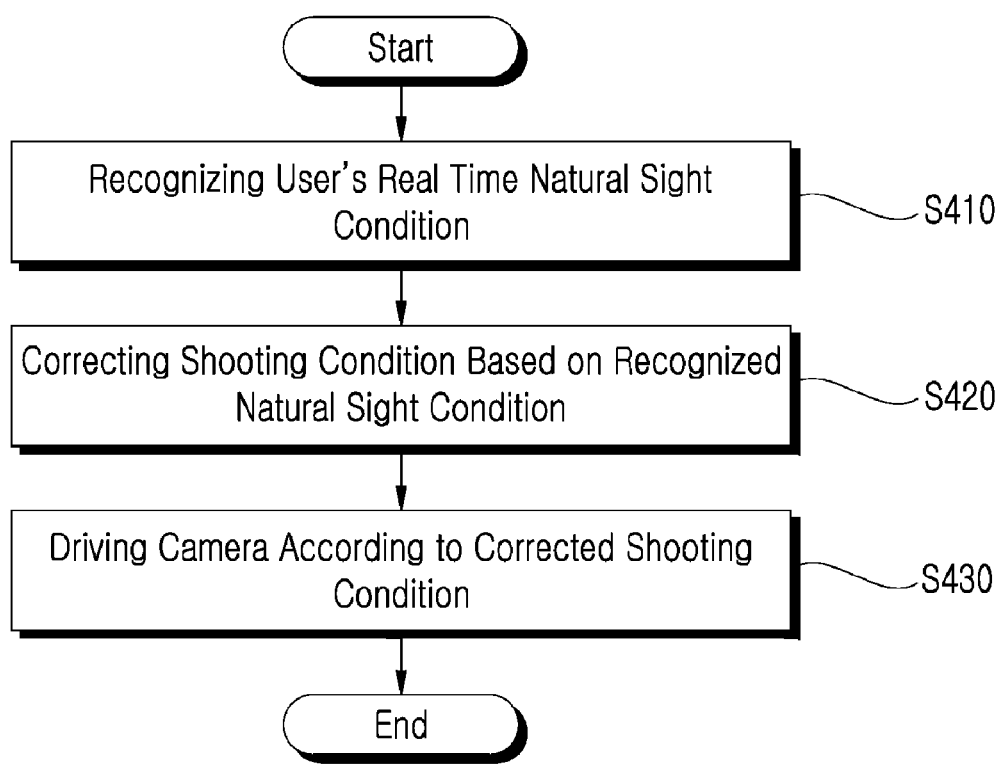
FIG. 4 is a flow chart illustrating data processing flow for driving a camera according to an embodiment.

FIG. 4 is a flow chart illustrating data processing flow for driving a camera according to an embodiment.

In step S410, the sensing module 210 performs a process for sensing the user's real-time natural sight conditions including a sight line, a visual angle, and a view of the user of the smart terminal, and a distance and an angle between a pupil and the smart terminal for a see-through display of an image shot by the rear camera 40 of the smart terminal 100.

In step S420, the control module 230 performs a process for controlling the shooting conditions including the shooting angle, the focus, and the focal length of the rear camera of the smart terminal based on the distance and angle information between the sight line, the visual angle, the view, and the user's pupil and the smart terminal included in the user's natural sight conditions transmitted from the sensing module 210.

In step S430, the camera is driven according to the shooting conditions transmitted from the control module 230 and performs a process for shooting.

Figure 5:
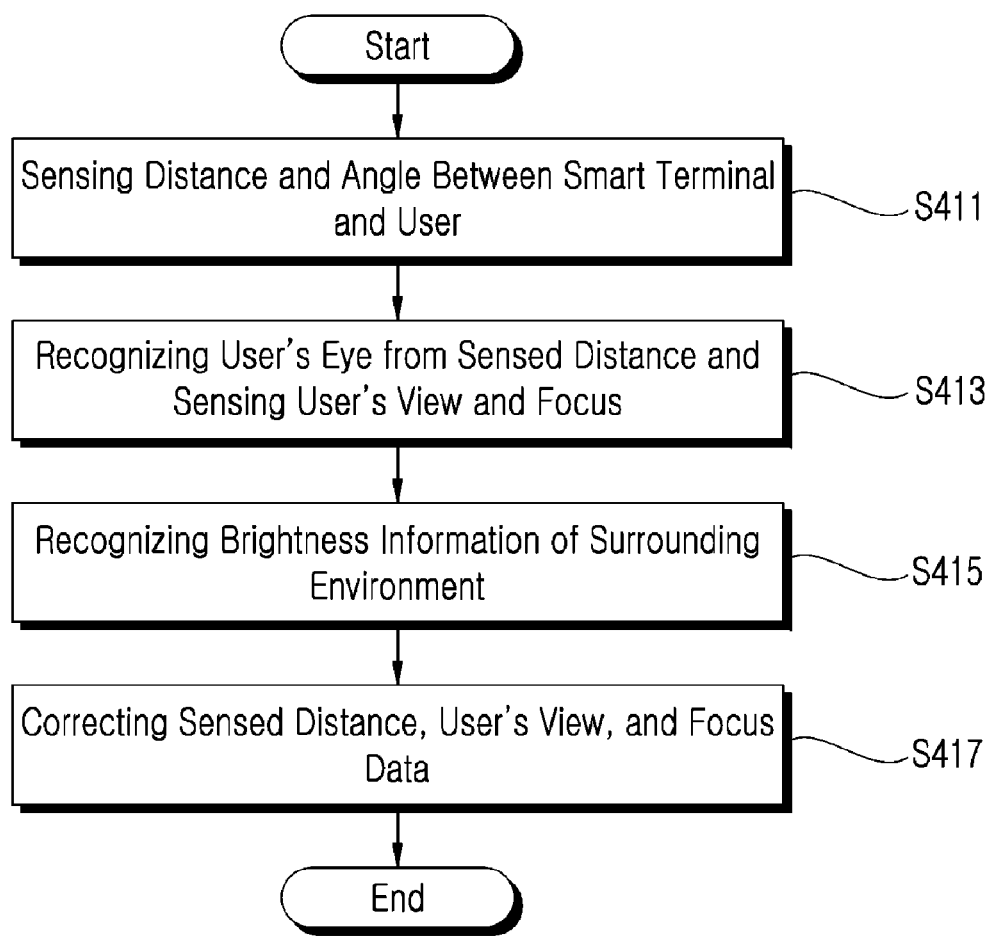
FIG. 5 is a flow chart more specifically illustrating a process for sensing natural sight conditions of the user according to an embodiment.

FIG. 5 is a flow chart more specifically illustrating a process for sensing user's natural sight conditions according to an embodiment.

In step S411, the distance measuring unit 211 of the sensing module 210 senses the distance and angle between the smart terminal and the user. In step S411, the distance measuring unit 211 may further recognize the user's movement information or the like including a pose of the user holding the smart terminal, the degree of rotation of the head or the like, and then measure the distance and angle between the user and the smart terminal.

In step S413, the focus recognition unit 213 recognizes the user's eye based on the sensed distance, and senses the user's natural sight conditions such as the view, the visual angle, the user's focus through an iris and a pupil recognition in the recognized eye. In step S415, the sensing module 210 performs a process for further recognizing the surrounding brightness information.

In step S417, the correction unit 217 performs a process for correcting the sensed distance and the user's natural sight conditions information by reflecting a pre-stored distance and angle between the user's body data and cameras provided on the front and rear. Further, in step S417, sensing data may be corrected using accumulated an eye position, a sight line, a view, and a focus for each eye position information recognized for each distance between the user of the smart terminal and the smart terminal, and the sensing data may be corrected using the user's body data including a pre-stored maximum arm length, the iris and pupil recognition information of the user.

Figure 6:
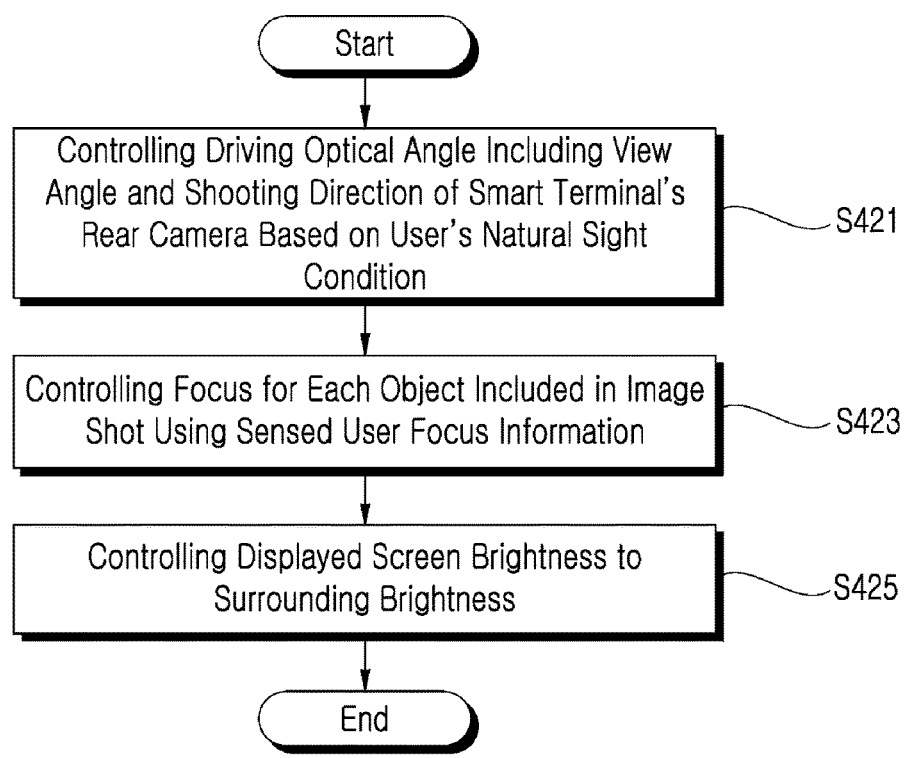
FIG. 6 is a flow chart more specifically illustrating a process for adjusting camera driving conditions according to an embodiment.

FIG. 6 is a flow chart more specifically illustrating a process for adjusting camera driving conditions according to an embodiment.

In step S421, the optical angle control unit 231 performs a process for controlling the driving optical angle including the view angle and the shooting direction of the rear camera of the smart terminal based on the sensed user's natural sight conditions in order to match the size and angle of the screen shot by the rear camera of the smart terminal with the surrounding background of the smart terminal 100.

In step S423, the focus control unit 233 performs a process for controlling the focus for each object included in an image shot using the sensed user's focus information.

In step S425, the screen brightness control unit 235 performs a process for sensing the surrounding brightness data and controlling the brightness of the screen displayed to the surrounding brightness.

The camera driving device and the method thereof according to the disclosed embodiment may recognize the user's natural sight on the front of the portable smart terminal, and control the shooting conditions of the rear camera to drive the camera mounted on the rear of the smart terminal as the same conditions as viewed by his/her eye of the user, thereby minimizing the distortion between an image recognized by the user's natural sight and an image shot by the rear camera and displayed on the front of the smart phone. When applying the embodiments described in the present disclosure to the augmented reality technology, the user experience in the augmented reality may be improved. In addition, when applying to the general photography and movie shooting through the camera, the user may not need to operate directly the shooting conditions of the camera, and it may recognize the user's natural sight conditions and operate the camera automatically to the same conditions as those of the user's natural sight conditions, thereby improving the user convenience.

The disclosed contents are illustrative only, and it could be modified and performed in a variety of ways by one of ordinary skill in the art without departing from the teaching defined in the claims, and thus, the scope of protection of the disclosed contents is not limited to the specific embodiments described above.

What is claimed is:

1. A camera driving device of a smart terminal comprising:
a sensing module sensing real time natural sight conditions of a user including a sight line, a visual angle, and a view of the user of the smart terminal, and a distance and an angle between a pupil and the smart terminal;
a control module controlling shooting conditions including an optical angle, a focus, a focal length, and a magnification of a rear camera of the smart terminal based on the real time natural sight conditions of the user transmitted from the sensing module; and
a shooting module driven according to the shooting conditions transmitted from the control module,
wherein the sensing module senses the real time natural sight conditions of the user using eye position recognition data accumulated according to a motion of the user including a distance between the smart terminal and the user and a degree of movement and rotation of a head, and body data of the user including a user's pre-stored maximum arm length, and iris and pupil recognition information,
wherein the sensing module comprises:
a distance measuring unit measuring a distance between a front camera of the smart terminal and the user via triangulation or radio wave transmission/reception;
a focus recognition unit recognizing a user's eye by recognizing the measured distance and a movement of the user, and recognizing a user's focus by sensing an iris or a pupil from the recognized eye;
an angle measuring unit measuring an angle between the user's pupil and the smart terminal; and
a correction unit correcting the distance data between the user and the smart terminal, transmitted from the distance measuring unit, the user's focus data transmitted from the focus recognition unit, and the angle data between the smart terminal and the pupil transmitted from the angle measuring unit, considering a pre-stored distance between the front camera and the rear camera of the smart terminal.

2. The camera driving device of claim 1, wherein the correction unit corrects data transmitted from the distance measuring unit, the focus recognition unit, and the angle measuring unit using the eye position recognition data accumulated according to the motion of the user including the distance between the smart terminal and the user and the degree of the head movement and rotation, and the body data of the user including the user's pre-stored maximum arm length, and the iris and pupil recognition information,
wherein the focus recognition unit figures out distance information between a camera and the user using the body data of the user and the eye position recognition data accumulated by the motion of the user, and recognizes the focus after recognizing the user's eye.

3. The camera driving device of claim 1, wherein the sensing module further senses brightness information of a surrounding environment shot by a camera of the smart terminal.

4. The camera driving device of claim 1, wherein the control module comprises:

an optical angle control unit controlling a driving optical angle including a view angle and a shooting direction of the rear camera of the smart terminal based on the sensed natural sight conditions of the user in order to match a size and an angle of a screen shot by the rear camera of the smart terminal with a surrounding background of the smart terminal;

a focus control unit controlling a focus for each object included in an image shot by the rear camera of the smart terminal using the sensed focus information of the user; and a screen brightness control unit controlling brightness of a screen displayed on a front of the smart terminal to sensed surrounding brightness according to the sensed surrounding brightness data.

5. A method of driving a camera for a see-through display of an image shot by a rear camera of a smart terminal comprising:

(A) sensing, in a sensing module, real time natural sight conditions of a user including a sight line, a visual angle, and a view of the user of the smart terminal, and a distance and an angle between a pupil and the smart terminal;

(B) controlling, in a control module, shooting conditions including a shooting angle, a focus, and a focal length of a rear camera of the smart terminal based on the natural sight conditions of the user transmitted from the sensing module; and (C) shooting, in a camera, driven according to the shooting conditions transmitted from the control module, wherein the sensing (A) of the real time natural sight conditions of the user further comprises:

sensing the real time natural sight conditions of the user using eye position recognition data accumulated according to a motion of the user including a distance between the smart terminal and the user and a degree of movement and rotation of a head, and body data of the user including a pre-stored maximum arm length and iris and pupil recognition information; and correcting the distance data between the user and the smart terminal, the user's sight line and focus, and angle data between the user's sight line and the smart terminal by reflecting a pre-stored distance between a front camera and a rear camera of the smart terminal, wherein the correcting of the distance data between the user and the smart terminal, and the user's sight line and focus data corrects the sensed distance, angle, and focus data using eye position data recognized and accumulated for each distance between the user of the smart terminal and the smart terminal, and the sight line, view, and focus information for each eye position, and corrects the sensed distance, angle, and focus data using the user's body data including the pre-stored maximal arm length, iris and pupil recognition information of the user, and the user's motion information.

6. The method of claim 5, wherein the sensing (A) of the real time natural sight conditions of the user comprises:

measuring the distance between the front camera of the smart terminal and the user via triangulation or radio wave transmission/reception between the front camera of the smart terminal and the recognized user's eye;

recognizing the user's eye based on the measured distance and recognizing the user's sight line and focus by sensing an iris or a pupil from the recognized eye; and measuring an angle between the sensed user's sight line and the smart terminal.

7. The method of claim 5, wherein the correcting of the distance data between the user and the smart terminal, the user's sight line and focus data corrects the sensed distance, angle, and focus data using eye position data recognized and accumulated for each distance between the user of the smart terminal and the smart terminal, and the sight line, view, and focus information for each eye position, and corrects the sensed distance, angle, and focus data using the user's body data including the pre-stored maximal arm length, iris and pupil recognition information of the user, and the user's motion information.

8. The method of claim 5, wherein the sensing (A) of the real time natural sight conditions of the user further senses brightness information of a surrounding environment shot by a camera of the smart terminal.

9. The method of claim 5, wherein the controlling (B) of the shooting conditions comprises:

controlling a driving optical angle including a view angle and a shooting direction of the rear camera of the smart terminal based on the sensed natural sight conditions of the user in order to match a size and an angle of a screen shot by the rear camera of the smart terminal with a surrounding background of the smart terminal;

controlling a focus for each object included in an image shot by the rear camera of the smart terminal using the sensed focus information of the user; and controlling brightness of a screen displayed to surrounding brightness according to the sensed surrounding brightness data.

* * * * *